US012621869B2

(12) United States Patent
Lee et al.

(10) Patent No.: US 12,621,869 B2
(45) Date of Patent: May 5, 2026

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Youngdae Lee, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 425 days.

(21) Appl. No.: 18/280,057

(22) PCT Filed: Apr. 6, 2022

(86) PCT No.: PCT/KR2022/004955
§ 371 (c)(1),
(2) Date: Sep. 1, 2023

(87) PCT Pub. No.: WO2022/216043
PCT Pub. Date: Oct. 13, 2022

(65) Prior Publication Data
US 2024/0147536 A1     May 2, 2024

(30) Foreign Application Priority Data

Apr. 6, 2021     (KR) ........................ 10-2021-0044784

(51) Int. Cl.
| *H04W 72/12* | (2023.01) |
| *H04L 1/18* | (2023.01) |
| *H04L 1/1812* | (2023.01) |
| *H04W 74/08* | (2024.01) |
| *H04W 74/0833* | (2024.01) |
(Continued)

(52) U.S. Cl.
CPC ....... *H04L 1/1812* (2013.01); *H04W 74/0833* (2013.01); *H04W 74/0836* (2024.01); *H04W 74/0838* (2024.01)

(58) Field of Classification Search
CPC ... H04L 1/1812; H04L 1/1822; H04L 1/1825; H04L 1/1854; H04L 1/1896; H04L 5/0053; H04L 5/0055; H04W 74/0833; H04W 74/0836; H04W 74/0838
See application file for complete search history.

(56) References Cited

U.S. PATENT DOCUMENTS

| 2011/0099447 A1 | 4/2011 | Park et al. |
| 2020/0037361 A1 | 1/2020 | Chakraborty et al. |
(Continued)

FOREIGN PATENT DOCUMENTS

| CN | 111435899 | 7/2020 |

OTHER PUBLICATIONS

International Search Report and Written Opinion in International Appln. No. PCT/KR2022/004955, mailed on Jul. 26, 2022, 10 pages.
(Continued)

*Primary Examiner* — Christopher M Crutchfield
*Assistant Examiner* — Aixa A Guadalupe Cruz
(74) *Attorney, Agent, or Firm* — Fish & Richardson P.C.

(57) ABSTRACT

According to an embodiment of the present disclosure, a UE may determine not to transmit the HARQ feedback report for a UE-group common PDSCH at least during a random access procedure is on-going, even though the HARQ process has been enabled for the UE-group common PDSCH.

13 Claims, 10 Drawing Sheets

(51) Int. Cl.
    *H04W 74/0836*     (2024.01)
    *H04W 74/0838*     (2024.01)

(56)               References Cited

U.S. PATENT DOCUMENTS

| | | | |
|---|---|---|---|
| 2020/0068619 A1 | 2/2020 | Kim et al. | |
| 2020/0344012 A1* | 10/2020 | Karaki | H04L 1/1812 |
| 2020/0374048 A1 | 11/2020 | Lei et al. | |
| 2023/0071767 A1* | 3/2023 | Zhou | H04L 1/1854 |
| 2024/0057088 A1* | 2/2024 | Matsumura | H04W 72/1273 |

OTHER PUBLICATIONS

Moderator (CMCC), "Summary#6 on mechanisms to support group scheduling for RRC_Connected UEs for NR MBS," 3GPP TSG RAN WG1 #103-e, R1-2009744, e-Meeting, Oct. 26-Nov. 13, 2020, 32 pages.
CAICT, "Considerations on Produce for Two-step RACH," R1-1913026, 3GPP TSG RAN WG1, Meeting #99, Reno, US, Nov. 18-22, 2019, 7 pages.
Ericsson et al., "Collision between RACH transmission and HARQ-ACK repetition," R1-124496, 3GPP TSG-RAN WG1, Meeting #70bis, San Diego, USA, Oct. 8-12, 2012, 2 pages.
Extended European Search Report in European Appln. No. 22784952. 8, mailed on Jun. 24, 2024, 13 pages.
ZTE, Sanechips, "Remaining issues of 2-step RACH procedures," R1-1911828, 3GPP TSG RAN WG1, Meeting #99, Reno, USA, Nov. 18-22, 2019, 21 pages.

* cited by examiner

[Fig. 1]
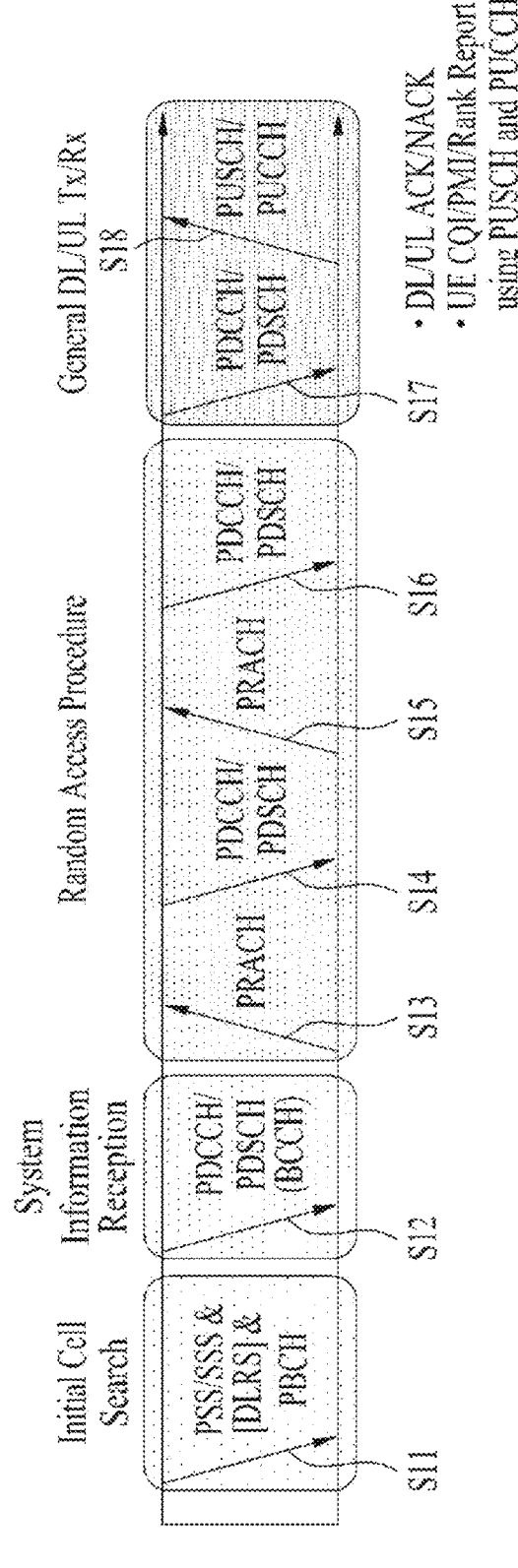

【Fig. 2】
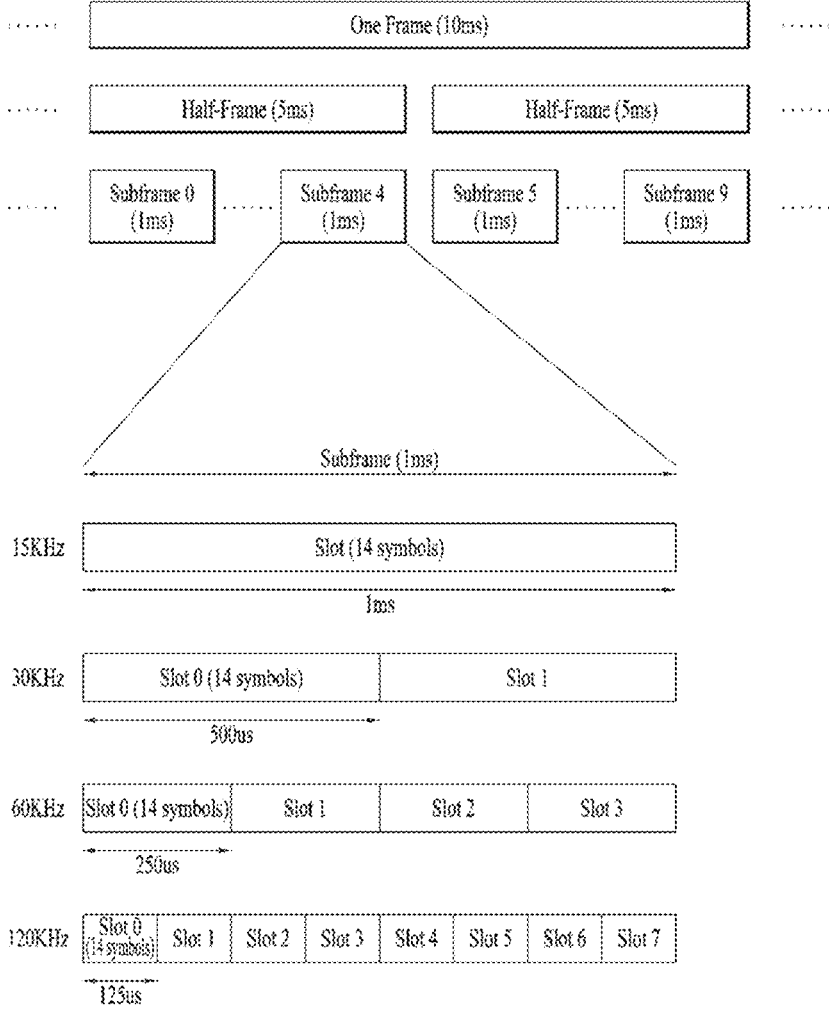

【Fig. 3】
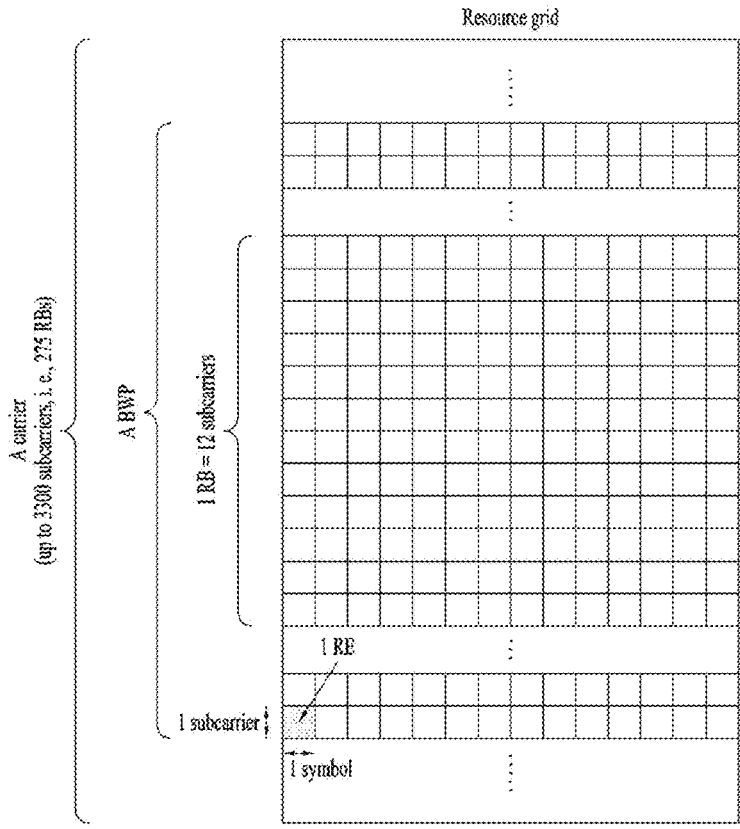
【Fig. 4】
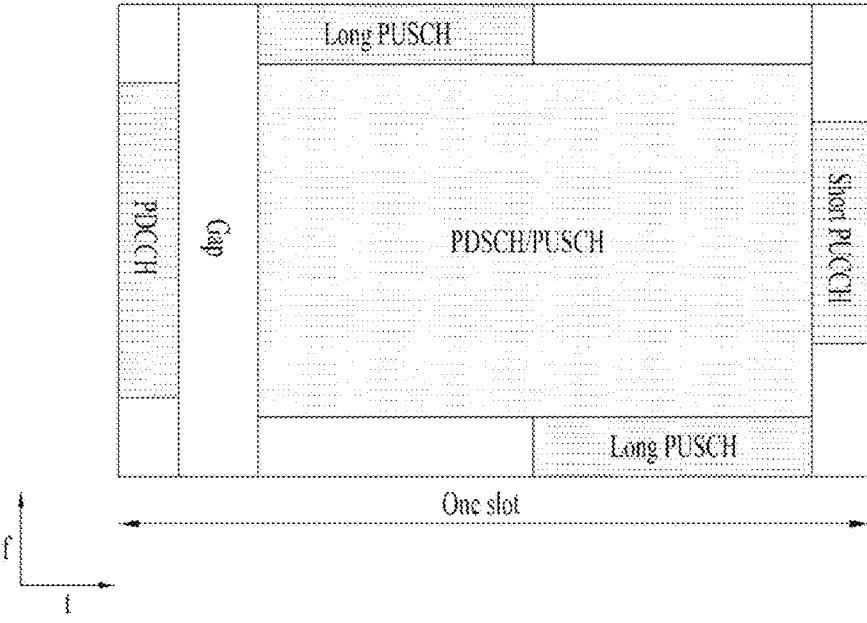

【Fig. 5】
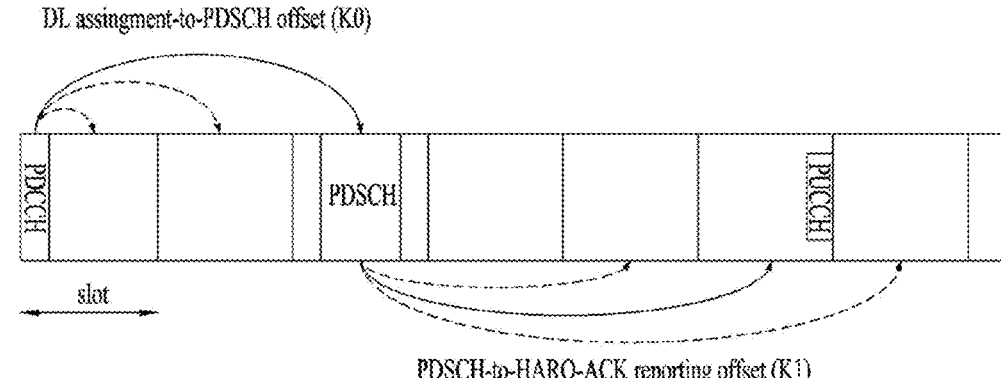
【Fig. 6】
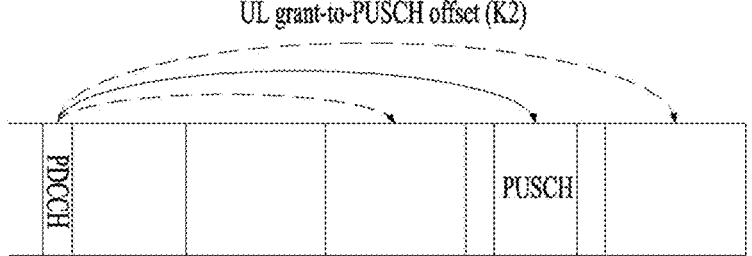
【Fig. 7】
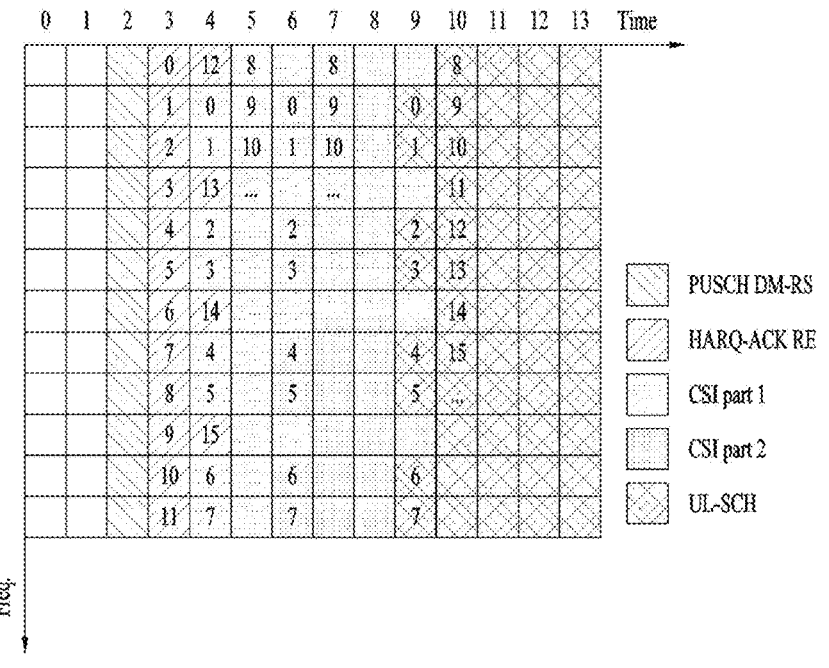

[Fig. 8]

【Fig. 9】
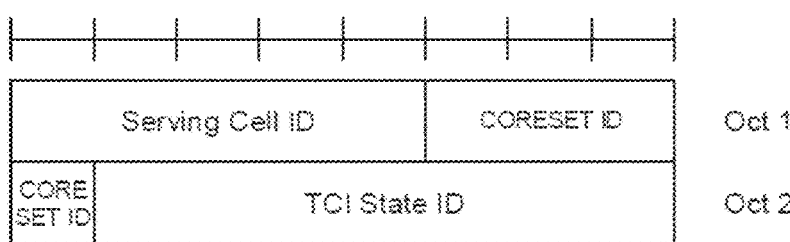
| Serving Cell ID | CORESET ID | Oct 1 |
|---|---|---|
| CORE SET ID | TCI State ID | Oct 2 |
【Fig. 10】
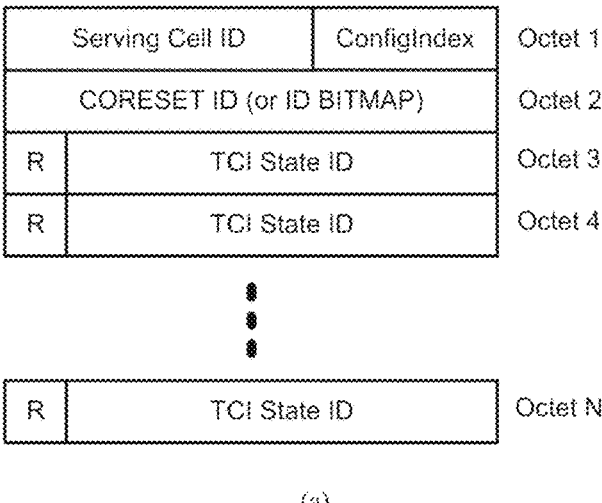
| Serving Cell ID | ConfigIndex | Octet 1 |
|---|---|---|
| CORESET ID (or ID BITMAP) | | Octet 2 |
| R | TCI State ID | Octet 3 |
| R | TCI State ID | Octet 4 |
| R | TCI State ID | Octet N |
(a)
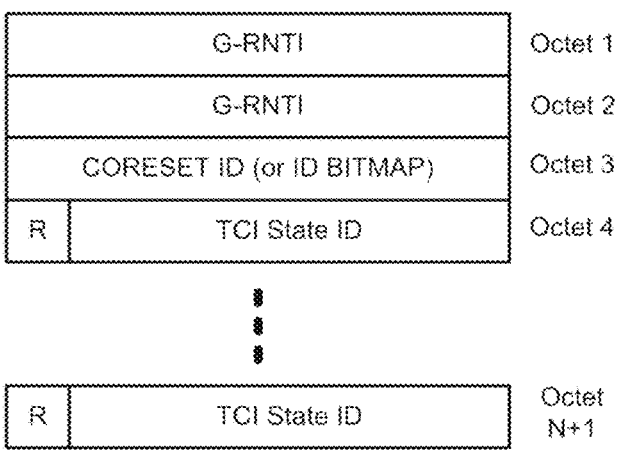
| G-RNTI | Octet 1 |
|---|---|
| G-RNTI | Octet 2 |
| CORESET ID (or ID BITMAP) | Octet 3 |
| R  TCI State ID | Octet 4 |
| R  TCI State ID | Octet N+1 |
(b)

[Fig. 11]

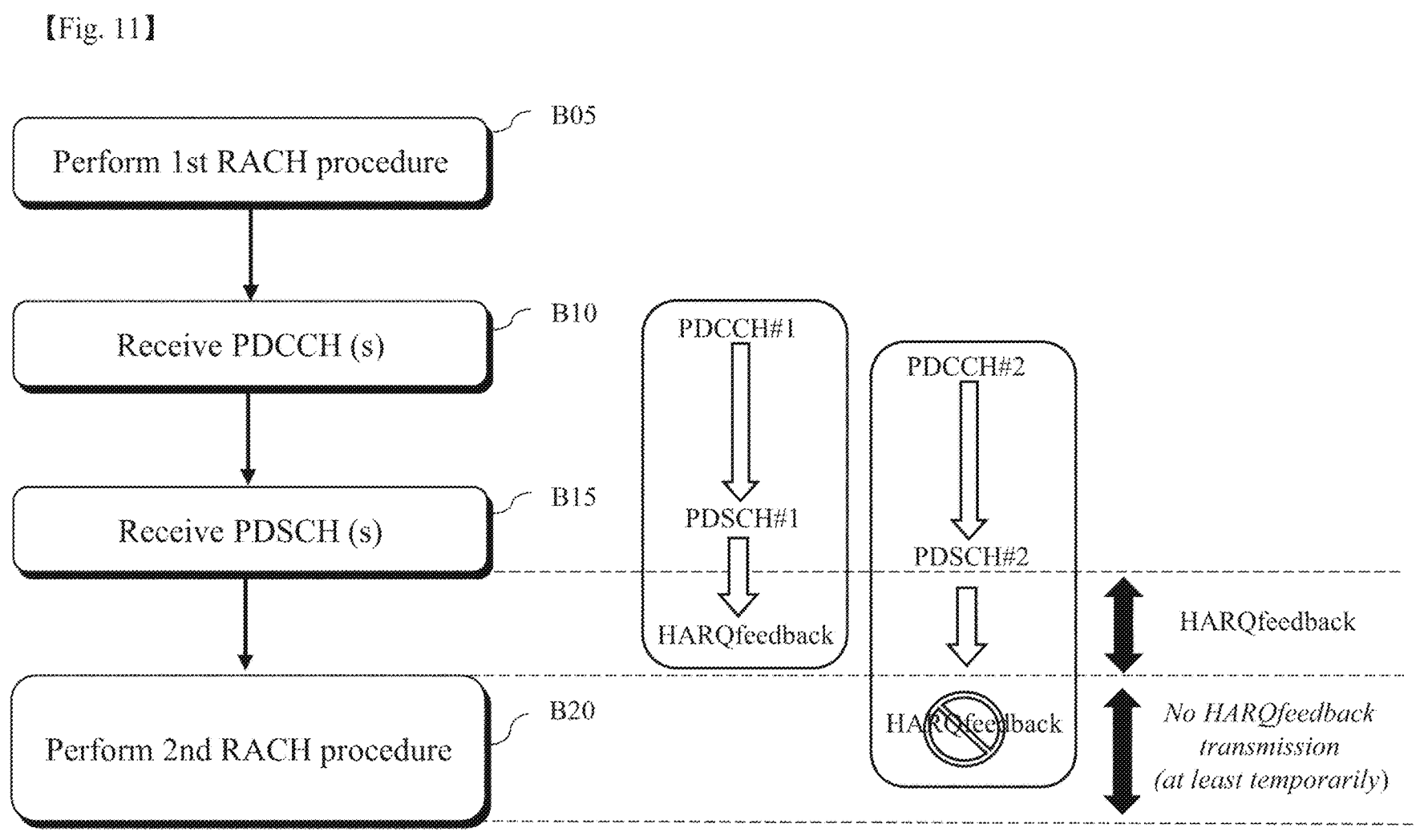

B05 — Perform 1st RACH procedure

B10 — Receive PDCCH (s)

B15 — Receive PDSCH (s)

B20 — Perform 2nd RACH procedure

PDCCH#1 → PDSCH#1 → HARQfeedback

PDCCH#2 → PDSCH#2 → HARQfeedback

HARQfeedback

No HARQfeedback transmission (at least temporarily)

[Fig. 12]

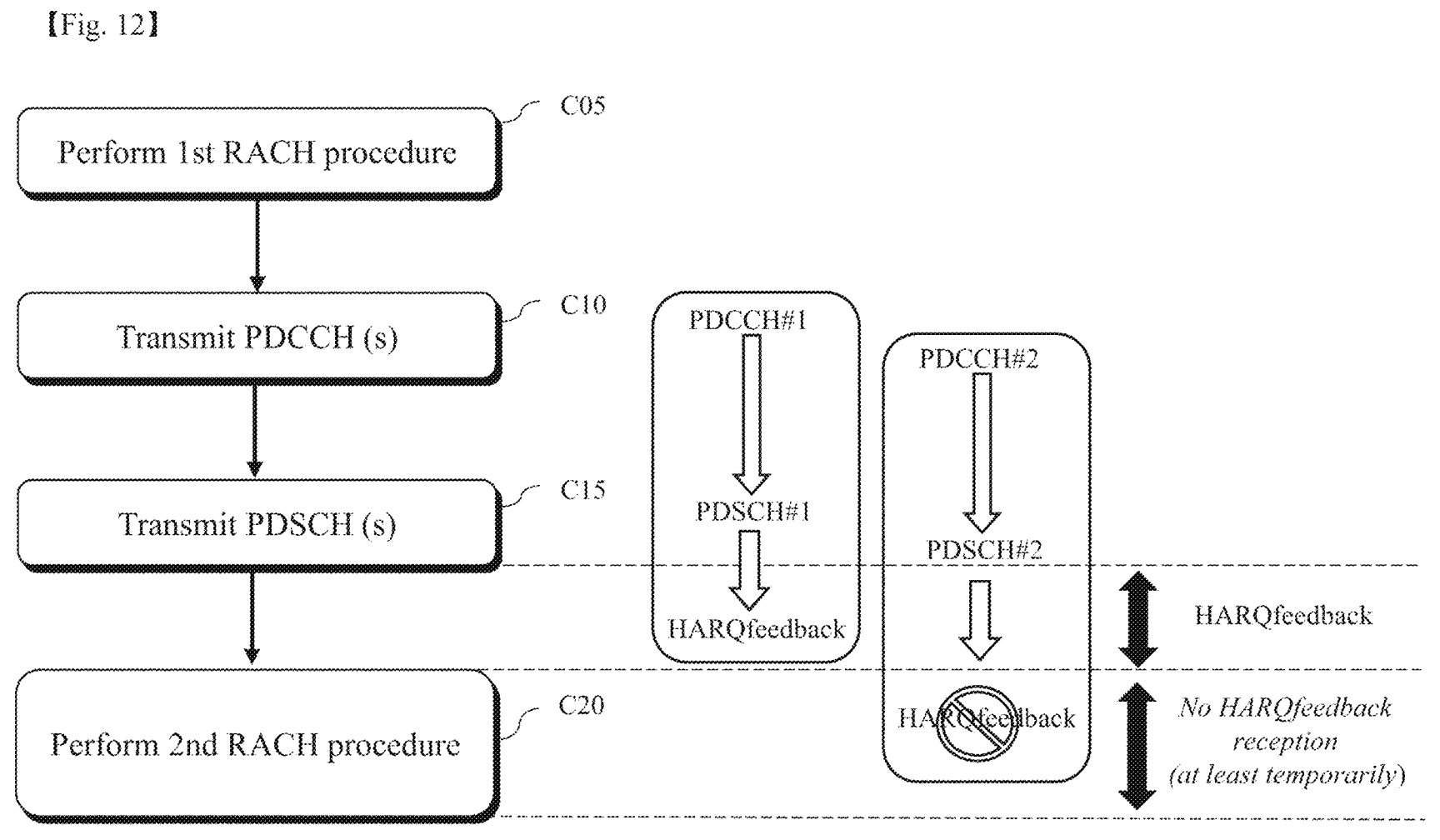

C05 Perform 1st RACH procedure

C10 Transmit PDCCH (s)

C15 Transmit PDSCH (s)

C20 Perform 2nd RACH procedure

PDCCH#1 → PDSCH#1 → HARQfeedback

PDCCH#2 → PDSCH#2 → HARQfeedback

HARQfeedback

No HARQfeedback reception (at least temporarily)

【Fig. 13】
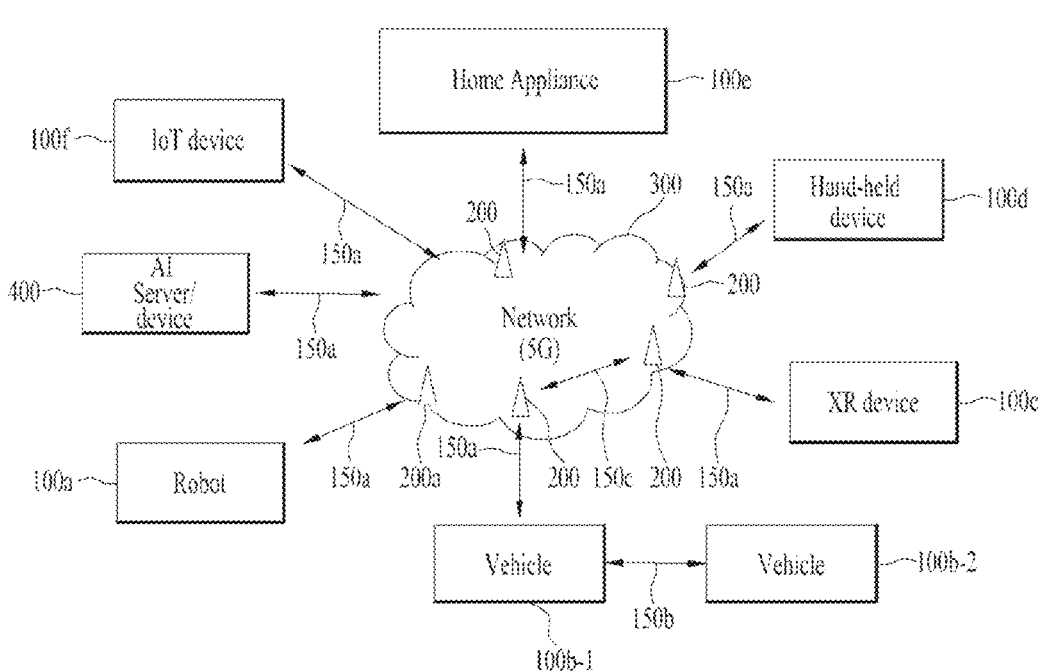
【Fig. 14】
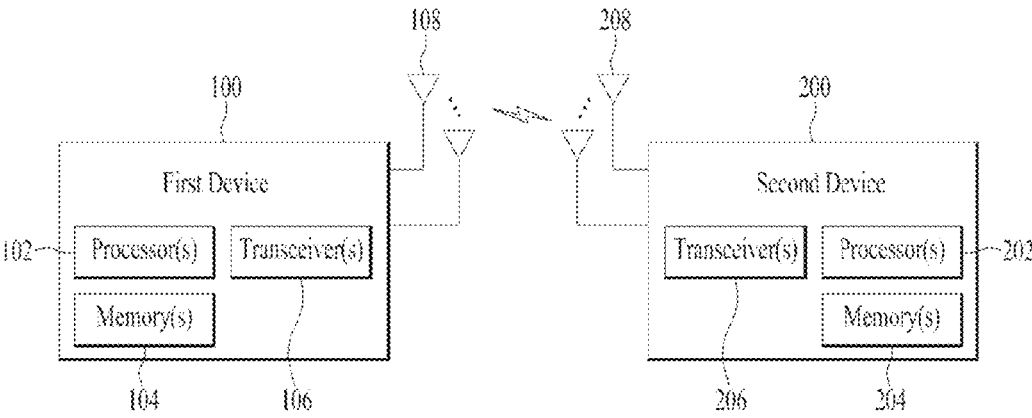

【Fig. 15】
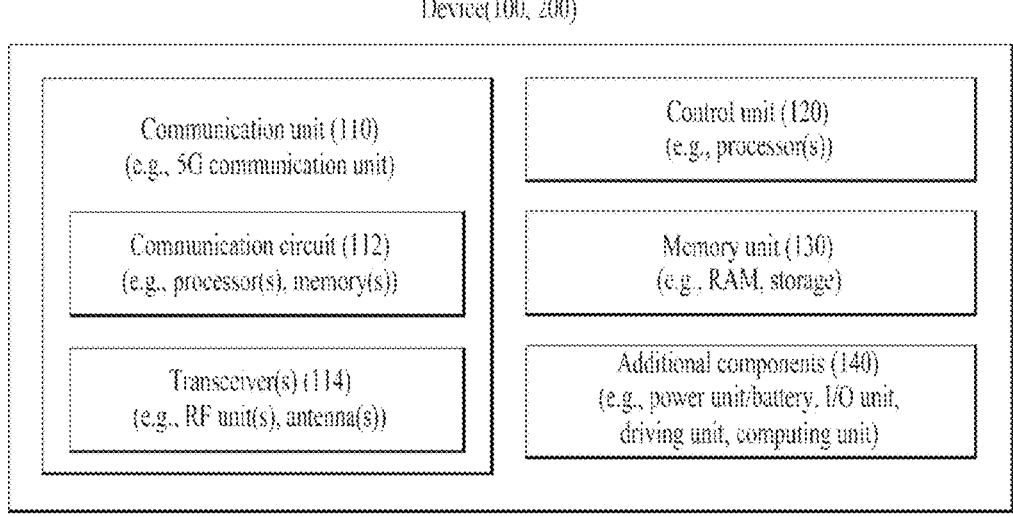
【Fig. 16】
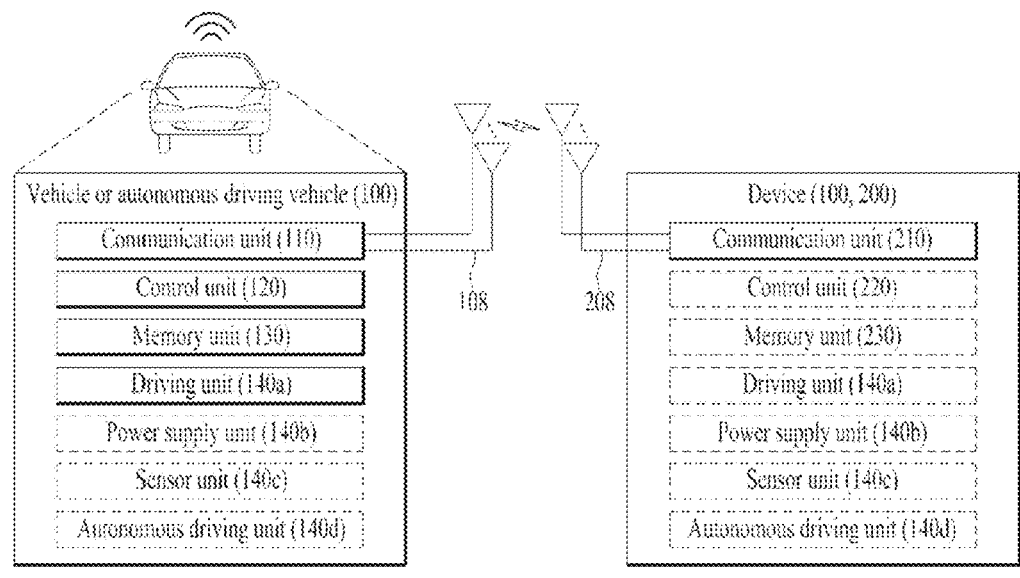
【Fig. 17】
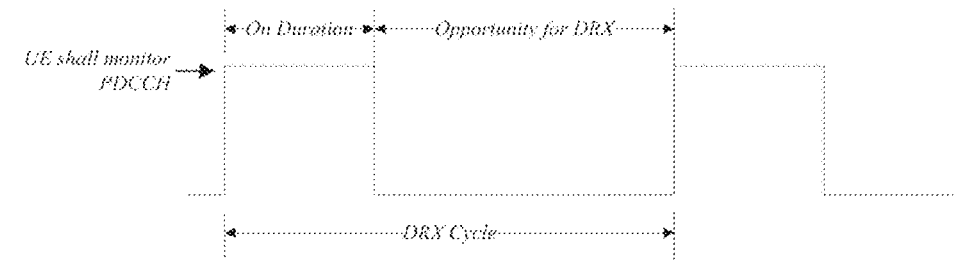

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2022/ 004955, filed on Apr. 6, 2022, which claims the benefit of Korean Application No. 10-2021-0044784, filed on Apr. 6, 2021. The disclosures of the prior applications are incorporated by reference in their entirety.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE OF INVENTION

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Solution to Problem

In an aspect of the present disclosure, there is provided a method of transmitting a signal by a user equipment (UE) in a wireless communication system, the method may comprise performing a first random access procedure including a first random access preamble transmission; receiving a UE-group common physical downlink control channel (PDCCH) after successful completion of the first random access procedure; receiving a UE-group common physical downlink shared channel (PDSCH) based on the UE-group common PDCCH; and performing a second random access procedure including a second random access preamble transmission after the successful completion of the first random access procedure. Based on that i) a hybrid automatic repeat request (HARQ) process is enabled for the UE-group common PDSCH, ii) the second random access procedure has been triggered before transmitting a HARQ feedback report for the UE-group common PDSCH, and iii) the second random access procedure is not completed: the may determine not to transmit the HARQ feedback report for the UE-group common PDSCH at least during the second random access procedure is on-going.

Preferably, the UE does not transmit the HARQ feedback report for the UE-group common PDSCH even though the HARQ process has been enabled for the UE-group common PDSCH.

Preferably, the UE determines not to transmit the HARQ feedback report for the UE-group common PDSCH based on that the second random access procedure is related to a contention-based random access procedure.

Preferably, the UE determines not to transmit the HARQ feedback report for the UE-group common PDSCH based on that the second random access procedure is related to a scheduling request (SR).

Preferably, the UE drops the HARQ feedback report for the UE-group common PDSCH based on that the HARQ feedback report for the UE-group common PDSCH overlaps with a uplink signal transmission of the second random access procedure in a time domain.

Preferably, the uplink signal transmission of the second random access procedure is performed in response to a message-B (MsgB) of a 2-step random access procedure or a message 4 (Msg4) of a 4-step random access procedure.

Preferably, the uplink signal transmission of the second random access procedure is related to a physical uplink control channel (PUCCH) or a physical uplink shared channel (PUSCH).

Preferably, the UE may receive, from a base station, a request for the HARQ feedback report after completion of the second random access procedure; and transmit the HARQ feedback report to the base station based on the request for the HARQ feedback report.

In another aspect of the present disclosure, there is provided a computer-readable storage medium having stored thereon a program for executing the above-described method.

In another aspect of the present disclosure, there is provided a UE configured to perform the method.

In another aspect of the present disclosure, there is provided a device configured to control the UE configured to perform the method.

In another aspect of the present disclosure, there is provided a method of receiving a signal by a base station (BS) in a wireless communication system, the method may comprise performing a first random access procedure including a first random access preamble reception from a user equipment (UE); transmitting a UE-group common physical downlink control channel (PDCCH) after successful completion of the first random access procedure; transmitting a UE-group common physical downlink shared channel (PDSCH) based on the UE-group common PDCCH; and performing a second random access procedure including a second random access preamble reception from the UE after the successful completion of the first random access procedure. Based on that i) a hybrid automatic repeat request (HARQ) process is enabled for the UE-group common PDSCH, ii) the second random access procedure has been triggered before receiving a HARQ feedback report for the UE-group common PDSCH, and iii) the second random access procedure is not completed, the BS does not expect to receive the HARQ feedback report for the UE-group common PDSCH from the UE at least during the second random access procedure is on-going.

In another aspect of the present disclosure, there is provided a BS configured to perform the method.

Advantageous Effects of Invention

According to an embodiment of the present disclosure, HARQ-ACK for Multicast is not transmitted during contention-based RACH thereby collision of the HARQ-ACK transmission and RACH transmission can be resolved.

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF DRAWINGS

FIG. 1 illustrates physical channels used in a 3rd generation partnership project (3GPP) system as an exemplary wireless communication system, and a general signal transmission method using the same;

FIG. 2 illustrates a radio frame structure;

FIG. 3 illustrates a resource grid of a slot;

FIG. 4 illustrates exemplary mapping of physical channels in a slot;

FIG. 5 illustrates an example of a physical downlink shared channel (PDSCH) transmission/reception procedure;

FIG. 6 illustrates an example of a physical uplink shared channel (PUSCH) transmission/reception procedure;

FIG. 7 illustrates an example of multiplexing uplink control information (UCI) with a PUSCH;

FIG. 8 illustrates Activation and retransmission of group common SPS configuration according to an embodiment of the present disclosure;

FIG. 9 illustrates TCI State Indication for UE-specific MAC CE;

FIG. 10 illustrates MAC CE formats for 'TCI State Indication for Group Common MAC CE';

FIGS. 11 and 12 illustrate signal transmission and reception flows according to embodiments of the present disclosure;

FIGS. 13 to 16 illustrate a communication system 1 and wireless devices applicable to the present disclosure; and FIG. 17 illustrates discontinuous reception (DRX) operation applicable to the present disclosure.

MODE FOR THE INVENTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/user equipments (UEs) sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in following documents.

3GPP LTE

TS 36.211: Physical channels and modulation

TS 36.212: Multiplexing and channel coding

TS 36.213: Physical layer procedures

TS 36.300: Overall description

TS 36.321: Medium Access Control (MAC)

TS 36.331: Radio Resource Control (RRC)

3GPP NR

TS 38.211: Physical channels and modulation

TS 38.212: Multiplexing and channel coding

TS 38.213: Physical layer procedures for control

TS 38.214: Physical layer procedures for data

TS 38.300: NR and NG-RAN Overall Description

TS 38.321: Medium Access Control (MAC)

TS 38.331: Radio Resource Control (RRC) protocol specification

Abbreviations and Terms

PDCCH: Physical Downlink Control CHannel

PDSCH: Physical Downlink Shared CHannel

PUSCH: Physical Uplink Shared CHannel

CSI: Channel state information

RRM: Radio resource management

RLM: Radio link monitoring

DCI: Downlink Control Information

CAP: Channel Access Procedure

Ucell: Unlicensed cell

PCell: Primary Cell

PSCell: Primary SCG Cell

TBS: Transport Block Size

SLIV: Starting and Length Indicator Value

BWP: BandWidth Part

CORESET: COntrol REsourse SET

REG: Resource element group

SFI: Slot Format Indicator

COT: Channel occupancy time

SPS: Semi-persistent scheduling

PLMN ID: Public Land Mobile Network identifier

RACH: Random Access Channel

RAR: Random Access Response

MBMS: Multimedia Broadcast/Multicast Service

Msg3: Message transmitted on UL-SCH containing a C-RNTI MAC CE or CCCH SDU, submitted from upper layer and associated with the UE Contention Resolution Identity, as part of a Random Access procedure.

Special Cell: For Dual Connectivity operation the term Special Cell refers to the PCell of the MCG or the PSCell of the SCG depending on if the MAC entity is associated with the MCG or the SCG, respectively. Otherwise the term Special Cell refers to the PCell. A Special Cell supports PUCCH transmission and contention-based Random Access, and is always activated.

Serving Cell: A PCell, a PSCell, or an SCell

CG: Configured Grant

Type 1 CG or Type 2 CG: Type 1 configured grant or Type 2 configured grant

SPS: Semi-Persistent Scheduling

Fall-back DCI: DCI format can be used for fall-back operation, e.g., DCI format 0_0 and 1_0 non fall-back DCI: DCI format other than fall-back DCI, e.g., DCI format 0_1, 1_1

CORESET: COntrol REsource SET

SS: search space

FDRA: frequency domain resource allocation

TDRA: frequency domain resource allocation

LP, HP: Low(er) priority, High(er) priority

A/N for Cell A: A/N information for data (e.g., PDSCH) received in Cell A

CSI: Channel state information

RI: Rank indication

PMI: Precoding Matrix Indicator

CQI: Channel Quality Indicator

UL CI: Uplink cancelation indication

CAP: channel access procedure

CFR: Common Frequency Resource for MBS. One DL CFR provides group common PDCCH and group common PDSCH transmission resources for MBS. One UL CFR provides a HARQ-ACK PUCCH resource for group common PDSCH. One CFR is related to one MBS specific BWP or one UE specific BWP. One or more CFRs may be configured in one UE specific BWP. One CFR may be associated with one UE specific BWP.

TMGI: Temporary Mobile Group Identity, MBS service identifier indicating a specific service G-RNTI: Group Radio Network Temporary Identifier, UE group ID that receives MBS In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame, u}_{slot}$: Number of slots in a frame
$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS $(15*2^u)$ | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g., a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

A BS may transmit a control resource set (CORESET) configuration to a UE. A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE. The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. For example, the CORESET configuration and the PDCCH SS configuration may be transmitted in one message (e.g., by one RRC signaling) or separately in different messages.

searchSpaceType: indicates common search space (CSS) or UE-specific search space (USS) as well as a DCI format used in the corresponding SS type.

Subsequently, the BS may generate a PDCCH and transmit the PDCCH to the UE, and the UE may monitor PDCCH candidates in one or more SSs to receive/detect the PDCCH. An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|------|-------------|------|----------|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

Table 4 shows DCI formats transmitted on the PDCCH.

TABLE 4

| DCI format | Usage |
|------------|-------|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

PDSCH carries downlink data (e.g., DL-SCH transport block, DL-SCH TB). The modulation scheme such as Quadrature Phase Shift Keying (QPSK), 16 Quadrature Amplitude Modulation (QAM), 64 QAM, or 256 QAM is applied to the PDSCH. A codeword is generated by encoding the TB. The PDSCH can carry up to two codewords. Scrambling and modulation mapping are performed for each codeword, and modulation symbols generated from each codeword may be mapped to one or more layers. Each layer is mapped to resources along with a demodulation reference signal (DMRS), is generated as an OFDM symbol signal, and is transmitted through a corresponding antenna port.

PUCCH carries Uplink Control Information (UCI). UCI may include one or more of following information:

SR (Scheduling Request): Information used to request a UL-SCH resource.

HARQ (Hybrid Automatic Repeat reQuest)-ACK (Acknowledgment): It is a response to a downlink data packet (e.g., codeword) on the PDSCH, and indicates whether the downlink data packet has been successfully received. 1 bit of HARQ-ACK may be transmitted in response to a single codeword, and 2 bits of HARQ-ACK may be transmitted in response to two codewords. The HARQ-ACK response includes positive ACK (simply, ACK), negative ACK (NACK), DTX or NACK/DTX. Here, HARQ-ACK may be called as HARQ ACK/NACK and ACK/NACK.

CSI (Channel State Information): feedback information for a downlink channel. Multiple Input Multiple Output (MIMO)-related feedback information includes a Rank Indicator (RI) and a Precoding Matrix Indicator (PMI).

Table 5 shows PUCCH formats. According to PUCCH length, PUCCH formats can be classified as Short PUCCH (format 0, 2) and Long PUCCH (format 1, 3, 4).

TABLE 5

| PUCCH format | Length in OFDM symbols $N^{PUCCH}_{symb}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a maximum size of 2 bits, and is mapped and transmitted based on a sequence. Specifically, the UE transmits a specific UCI to the base station by transmitting one of the plurality of sequences through the PUCCH having the PUCCH format 0. The UE transmits a PUCCH format 0 within a PUCCH resource for configuring a corresponding SR only when transmitting a positive SR.

PUCCH format 1 carries UCI with a maximum size of 2 bits, and a modulation symbol is spread by an orthogonal cover code (OCC) (configured differently depending on whether frequency hopping is performed) in the time domain. DMRS is transmitted in a symbol in which a modulation symbol is not transmitted (i.e., time division multiplexing (TDM) is performed).

PUCCH format 2 carries UCI having a bit size greater than 2 bits, and a modulation symbol is transmitted with DMRS based on frequency division multiplexing (FDM). DM-RS is located at symbol indexes #1, #4, #7, and #10 in a given resource block with a density of ⅓. A Pseudo Noise (PN) sequence is used for the DM RS sequence. For 2-symbol PUCCH format 2, frequency hopping may be enabled.

For PUCCH format 3, UE multiplexing is not performed in the same physical resource blocks, and the PUCCH format 3 carries UCI having a bit size greater than 2 bits. PUCCH resource of PUCCH format 3 does not include an orthogonal cover code. The modulation symbol is transmitted with the DMRS based on time division multiplexing (TDM).

For PUCCH format 4, UE multiplexing is supported for up to 4 UEs in the same physical resource blocks, and the PUCCH format 4 carries UCI having a bit size greater than 2 bits. PUCCH resource of PUCCH format 3 includes an orthogonal cover code. The modulation symbol is transmitted with DMRS based on time division multiplexing (TDM).

PUSCH carries uplink data (e.g., UL-SCH transport block, UL-SCH TB) and/or uplink control information (UCI). PUCCH is transmitted based on a CP-OFDM (Cyclic Prefix-Orthogonal Frequency Division Multiplexing) waveform or a Discrete Fourier Transform-spread-Orthogonal Frequency Division Multiplexing (DFT-s-OFDM) waveform. When the PUSCH is transmitted based on the DFT-s-OFDM waveform, the UE performs transform precoding for the PUSCH. For example, if transform precoding is not performed (e.g., transform precoding is disabled), the UE transmits a PUSCH based on the CP-OFDM waveform. If transform precoding is performed (e.g., transform precoding is enabled), the UE transmits the PUSCH based on a CP-OFDM waveform or a DFT-s-OFDM waveform. PUSCH transmission is dynamically scheduled by a UL grant in DCI (e.g., Layer 1 (PDCCH) signaling), and/or semi-statically scheduled based on higher layer (e.g., RRC) signaling (configured grant). PUSCH transmission may be performed on a codebook-based or non-codebook-based basis.

FIG. 5 illustrates an example of a PDSCH transmission/reception procedure. Referring to FIG. 5, the UE may detect the PDCCH in slot #n. Here, the PDCCH includes downlink scheduling information (e.g., DCI formats 1_0, 1_1), and the PDCCH indicates a DL assignment-to-PDSCH offset (K0) and a PDSCH-HARQ-ACK reporting offset (K1). For example, DCI formats 1_0 and 1_1 may include the following information:

Frequency domain resource assignment (FDRA): FDRA indicates the RB set allocated to the PDSCH.

Time domain resource assignment (TDRA): TDRA indicates K0 (e.g., slot offset), the starting position (e.g., OFDM symbol index) of the PDSCH within slot #n+K0, and the length of the PDSCH (e.g., the number of OFDM symbols).

PDSCH-to-HARQ feedback timing indicator, which indicates K1 (e.g., slot offset)

HARQ process number (4 bits), which indicates the HARQ process ID (Identity) for data (e.g., PDSCH, TB)

PUCCH resource indicator (PRI): PRI indicates a PUCCH resource to be used for UCI transmission among a plurality of PUCCH resources in the PUCCH resource set The UE receives the PDSCH in slot #(n+K0) based on the scheduling information received in slot #n. After completion of the PDSCH reception in slot #n1 (where, n+K0≤n1), the UE may transmit UCI through PUCCH from slot #(n1+K1). Here, the UCI may include a HARQ-ACK response for the PDSCH. In FIG. 5, for convenience, it is assumed that the SCS for the PDSCH and the SCS for the PUCCH are the same, and it is assumed that slot #n1=slot #n+K0, but the present disclosure is not limited thereto. If the SCSs are different, K1 may be indicated/interpreted based on the SCS of the PUCCH.

If the PDSCH is configured to carry a maximum of 1 TB, the HARQ-ACK response may have 1-bit. When the PDSCH is configured to carry a maximum of 2 TBs, the HARQ-ACK response may be configured with 2-bits when spatial bundling is not configured, and may be configured with 1-bits when spatial bundling is configured. When the HARQ-ACK transmission time for the plurality of PDSCHs is configured as slot #(n+K1), the UCI transmitted in the slot #(n+K1) includes HARQ-ACK responses for the plurality of PDSCHs.

Whether the UE should perform spatial bundling for the HARQ-ACK response may be configured for each cell group (e.g., RRC/higher layer signaling). As an example, spatial bundling may be individually configured in each of the HARQ-ACK response transmitted through the PUCCH and/or the HARQ-ACK response transmitted through the PUSCH.

Spatial bundling may be supported when the maximum number of TBs (or codewords) that can be received at one time in the corresponding serving cell (or schedulable through 1 DCI) is two (or two or more) (e.g., higher layer parameter maxNrofCodeWordsScheduledByDCI is equal to 2-TB). Meanwhile, a number of layers greater than four may be used for 2-TB transmission, and a maximum of four layers may be used for 1-TB transmission. As a result, when spatial bundling is configured in a corresponding cell group, spatial bundling may be performed on a serving cell that can schedule more than four layers among serving cells in the corresponding cell group. On a corresponding serving cell, a UE desiring to transmit a HARQ-ACK response through spatial bundling may generate a HARQ-ACK response by performing (bit-wise) logical AND operation on ACK/NACK (A/N) bits for a plurality of TBs.

For example, assuming that the UE receives DCI for scheduling 2-TB and receives 2-TB through the PDSCH based on the DCI. If spatial bundling is performed, a single A/N bit may be generated by performing a logical AND operation on the first A/N bit for the first TB and the second A/N bit for the second TB. As a result, if both the first TB and the second TB are ACKs, the UE reports the ACK bit value to the BS, and when either TB is NACK, the UE reports the NACK bit value to the BS.

For example, when only a 1-TB is actually scheduled on a serving cell in which 2-TB reception is allowed, the UE may generate a single A/N bit by performing a logical AND operation on the A/N bit for the corresponding 1-TB and a bit value of 1. As a result, the UE may report the A/N bit for the corresponding 1-TB to the BS as it is.

A plurality of parallel DL HARQ processes can be configured for DL transmission in the base station/terminal. A plurality of parallel HARQ processes allow DL transmissions to be performed continuously while waiting for HARQ feedback on successful or unsuccessful reception of the previous DL transmission. Each HARQ process is associated with a HARQ buffer of a MAC (Medium Access Control) layer. Each DL HARQ process manages information related to the number of MAC PDU (Physical Data Block) transmissions in the buffer, HARQ feedback for the MAC PDU in the buffer, and a current redundancy version. Each HARQ process is identified by a HARQ process ID.

FIG. 6 illustrates an example of a PUSCH transmission/reception procedure. Referring to FIG. 6, the UE may detect the PDCCH in slot #n. Here, the PDCCH includes uplink scheduling information (e.g., DCI formats 0_0, 0_1). DCI formats 0_0 and 0_1 may include the following information:

Frequency domain resource assignment (FDRA), which indicates the RB set allocated to the PUSCH Time domain resource assignment (TDRA), which indicates the slot offset K2, the start position (e.g., symbol index) and length (e.g., number of OFDM symbols) of the PUSCH in the slot. The start symbol and length may be indicated through a Start and Length Indicator Value (SLIV), or may be indicated respectively.

The UE may transmit the PUSCH in slot #(n+K2) according to the scheduling information received in slot #n. The PUSCH may include a UL-SCH TB.

FIG. 7 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated.

Multimedia Broadcast/Multicast Service (MBMS)

Hereinafter, MBMS schemes used in 3GPP LTE will be described. 3GPP MBMS may be classified as (i) a single frequency network (SFN) scheme in which a plurality of BS cells are synchronized to transmit the same date on a PMCH, and (ii) a single cell point to multipoint (SC-PTM) scheme in which broadcasting is performed over a PDCCH/PDSCH in the coverage of a corresponding cell. The SFN scheme is used to provide broadcast services over a wide area (e.g., MBMS area) on semi-statically pre-allocated resource(s), whereas the SC-PTM scheme is used to provide broadcast services within a cell coverage on dynamic resource(s).

SC-PTM provides one logical channel, i.e., a single cell multicast control channel (SC-MCCH) and one or more logical channels, i.e., one or more single cell multicast traffic channels (SC-MTCHs). The logical channels are mapped to a transport channel, a DL-SCH, and a physical channel, a PDSCH. The PDSCH carrying SC-MCCH data or SC-MTCH data is scheduled by a PDCCH scrambled with a group RNTI (G-RNTI). In this case, a temporary mobile group identity (TMGI) corresponding to a service ID may be one-to-one mapped to a specific G-RNTI value. Thus, if the BS provides a plurality of services, a plurality of G-RNTI values may be allocated for SC-PTM transmission. One or more UEs may perform PDCCH monitoring based on a specific G-RNTI to receive a specific service. For the specific service/G-RNTI, an SC-PTM dedicated DRX on-duration may be configured. In this case, the UEs may wake up for specific on-duration(s) and perform the PDCCH monitoring based on the G-RNTI.

[HARQ-ACK Feedback Disabling for UE Group Common Scheduling]

The above descriptions (3GPP system, frame structure, NR system, etc.) may be applied in combination with the methods proposed in the present disclosure, which will be described later, or used as supplements to clarify the technical features of the methods proposed in the present disclosure. In this document, '/' may mean 'and', 'or', or 'and/or' depending on the context.

In the prior art, the BS may configure a UE-dedicated SPS configuration for a specific UE, and may repeatedly allocate DL SPS resources according to a periodicity configured by the UE-dedicated SPS configuration. In this case, the DCI of the UE-dedicated PDCCH may indicate activation of a specific SPS configuration index (SPS activation) to instruct the corresponding UE to repeatedly receive the SPS resource according to the configured periodicity. These SPS resources are used for initial HARQ transmission, and the BS may allocate retransmission resources of a specific SPS configuration index through DCI of the UE-dedicated PDCCH. For example, if the UE reports a NACK for the SPS resource, the BS allocates the retransmission resource to DCI so that the UE can receive the DL retransmission. Meanwhile, the DCI of the UE-dedicated PDCCH may indicate deactivation of a specific SPS configuration index (SPS release or SPS deactivation). In this case, the UE does not receive the indicated SPS resource. Here, the CRC of the DCI for the activation/ re-transmission/deactivation is scrambled with a CS-RNTI.

REL-17 NR will introduce a DL broadcast or DL multicast transmission method to support a Multicast Broadcast Service (MBS) service similar to LTE MBMS. The BS provides a point-to-multipoint (PTM) transmission method and a point-to-point (PTP) transmission method for DL broadcast or DL multicast transmission. In the PTM transmission method for MBS, the BS transmits group-common PDCCH (GC PDCCH) and group-common PDSCH (GC PDSCH) to a plurality of UEs, and the plurality of UEs may receive the same group-common PDCCH and group-common, and decode the same MBS data received through the GC PDSCH. On the other hand, in the PTP transmission for MBS, the BS transmits the UE-dedicated PDCCH and the UE-dedicated PDSCH to a specific UE, and only the corresponding UE receives the UE-dedicated PDCCH and the UE-dedicated PDSCH. If there are a plurality of UEs receiving the same MBS, the BS separately transmits the same MBS data to individual UEs through different UE-dedicated PDCCHs and UE-dedicated PDSCHs.

Meanwhile, the base station may activate or deactivate HARQ-ACK feedback for the group common or UE-dedicated PDSCH to the UEs. However, there may be a problem in that the UE cannot transmit HARQ-ACK feedback for MBS reception when connection failure occurs.

Therefore, in one embodiment of the present invention, when a connection failure occurs, the UE deactivates HARQ-ACK feedback for MBS reception, and performs a RACH procedure. For example, the following methods can be used.

Method 1): HARQ Feedback Enabling/Disabling Indication
Disabled HARQ feedback may be indicated as follows:
Method 1-1: DCI Based Disabling
Opt 1: A specific value of PRI indicates disabling HARQ feedback.
Opt 2: A specific value of DAI indicates disabling HARQ feedback
Opt 3: A specific value of PDSCH repetition indicates disabling HARQ feedback
Opt 4: SUL indicator, if SUL is not configured by RRC
Method 1-2: RRC Based Disabling
Enabling and/or disabling is configured per HPN. For example, for DCI indicating HPN,
HPN=1 is configured for enabled
HPN=2 is configured for disabled
HPN=3 is configured for both. enabled or disabled is finally by DCI HPN=4 is configured for 'initially enabled and then disabled for retransmission'
HPN=5 is configured for 'initially disabled and then enabled for retransmission'
Enabling and/or disabling is configured per G-RNTI. For example, for scrambling CRC of DCI,
G-RNTI=87 is configured for both. Enabled or disabled is finally by DCI
A group of G-RNTIs mapped to same TMGI(s) is configured for both. Each of the
G-RNTIs is configured for either enabled or disabled. For example:
G-RNTI=87: enabled
G-RNTI=88: disabled
Method 2): If HARQ-ACK has been enabled for group common PDSCH, UE determines that HARQ-ACK for group common PDSCH is autonomously disabled when one of the following events occurs.
Upon detection of Beam failure
Upon detection of LBT failure
Upon detection of Handover interruption e.g. between HO command reception and RACH completion
Upon detection of RLF e.g. between triggering re-establishment and RACH completion
Upon triggering contention based RACH
Upon triggering contention-free RACH
Upon expiry of UL timing alignment timer (e.g. when UL timing becomes unsynchronized)
After HARQ-ACK feedback which was enabled by BS has been autonomously disabled, UE enables HARQ feedback upon completion of RACH.
In case of Contention based RACH, UE may send pending MBS HARQ-ACK via MSG3 or HARQ feedback to MSG4.
BS can request pending MBS HARQ-ACK via MSG2 or MSG4 (e.g. DCI or MAC CE)
In case of Contention-free RACH, UE sends pending MBS HARQ-ACK right after MSG2.
BS can request pending MBS HARQ-ACK via MSG2 e.g. DCI or MAC CE
Method 3): PTP Retransmission
PTP retransmission for PTM transmission is possible only within the CFR from which the PTM transmission was received.
However, if the BS indicates a plurality of CFRs and a plurality of CFRs are mapped (for all or specific TMG/G-RNTI(s)), for DCI indicating PTP transmission of CFR #1 and DCI indicating PTM transmission of CFR #2, if two DCIs indicate the same HPN value and NDI, it is assumed that the corresponding PTM/ PTP PDSCHs are configured to transmit the same TB.
When the BS PTP retransmission is performed on an active BWP of a UE, and the active BWP of the UE is mapped to the CFR (for all or specific TMG/G-RNTI(s)), 례, DCI indicating PTP transmission of the UE's active BWP and DCI indicating PTM transmission of CFR, if two DCIs indicate the same HPN value and NDI, it is assumed that PTM/PTP PDSCHs are configured to transmit the same TB.
PTP retransmission for PTM transmission may be allowed only in unicast UE's active BWP mapped with CFR of PTM transmission or CFR of PTM transmission. Therefore, if the PTP retransmission does not satisfy this condition, the UE does not consider the PTP retransmission as a retransmission of the PTM transmission.

Hereafter, various examples for the BS to dynamically transmit UE-group PDCCH/PDSCH to one or more UEs, is described.

Figure 8:
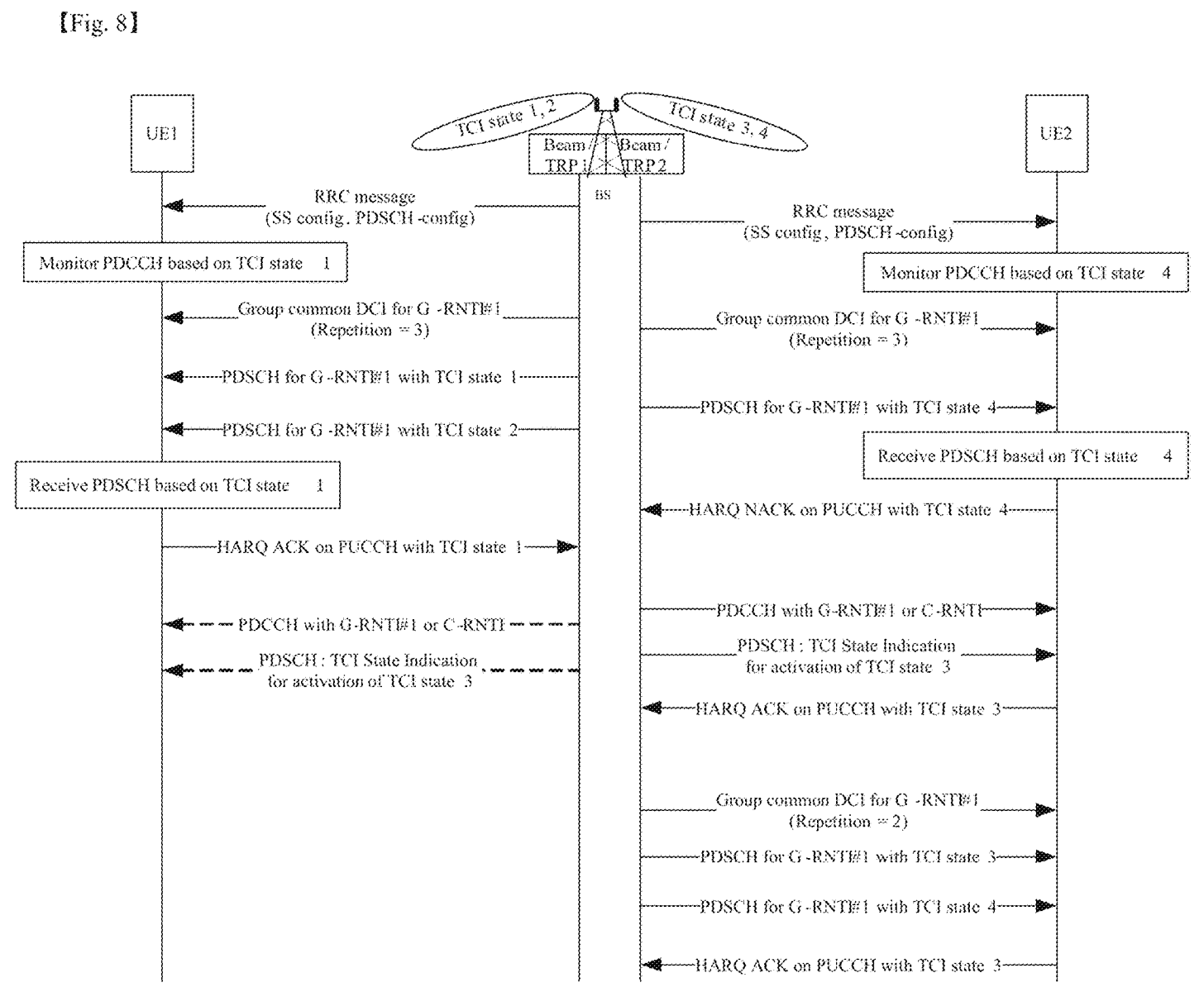

FIG. 8 illustrates Activation and retransmission of group common SPS configuration according to an embodiment of the present disclosure.

Referring to FIG. 8, UE enters RRC_CONNECTED mode and reports a message indicating one or more interested MBS services to BS.

A. The message is carried over one of UCI (Uplink Control Information), MAC CE (Control Element) and RRC message.

B. The interested MBS service in the message refers to one of TMGIs or one of G-RNTIs listed in a DL message received from BS.

If UE is not configured with a GC-CS-RNTI for a CFR or a seriving cell, UE uses CS-RNTI for activation, retransmission or release of one or more group common SPS configurations, if CS-RNTI has been configured for the CFR or the serving cell.

BS can associate a list of TMGIs or a list of G-RNTIs to one GC-CS-RNTI value. In this case, BS provides the list of TMGIs or the list of G-RNTIs which is associated to the GC-CS-RNTI value.

C. Each PDSCH configuration (i.e. PDSCH-config) consists of at least the following information elements for multicast and/or broadcast:

TABLE 6

```
PDSCH-Config ::= SEQUENCE {
dataScramblingIdentityPDSCH INTEGER (0..1023) OPTIONAL, -- Need S
dmrs-DownlinkForPDSCH-MappingTypeA SetupRelease { DMRS-DownlinkConfig
} OPTIONAL, -- Need M
dmrs-DownlinkForPDSCH-MappingTypeB SetupRelease { DMRS-DownlinkConfig
} OPTIONAL, -- Need M
tci-StatesToAddModList SEQUENCE (SIZE(1..maxNrofTCI-States)) OF TCI-State
OPTIONAL, -- Need N
tci-StatesToReleaseList SEQUENCE (SIZE(1..maxNrofTCI-States)) OF TCI-StateId
OPTIONAL, -- Need N
vrb-ToPRB-Interleaver ENUMERATED {n2, n4} OPTIONAL, -- Need S
resourceAllocation ENUMERATED { resourceAllocationType0, resourceAlloca-
tionType1, dynamicSwitch},
pdsch-TimeDomainAllocationList          SetupRelease        {        PDSCH-
TimeDomainResourceAllocationList } OPTIONAL, -- Need M
pdsch-AggregationFactor ENUMERATED { n2, n4, n8 } OPTIONAL, -- Need S
rateMatchPatternToAddModList          SEQUENCE          (SIZE
(1..maxNrofRateMatchPatterns)) OF RateMatchPattern OPTIONAL, -- Need N
rateMatchPatternToReleaseList SEQUENCE (SIZE (1..maxNrofRateMatchPatterns))
OF RateMatchPatternId OPTIONAL, -- Need N
rateMatchPatternGroup1 RateMatchPatternGroup OPTIONAL, -- Need R
rateMatchPatternGroup2 RateMatchPatternGroup OPTIONAL, -- Need R
rbg-Size ENUMERATED {config1, config2},
mcs-Table ENUMERATED {qam256, qam64LowSE} OPTIONAL, -- Need S
maxNrofCodeWordsScheduledByDCI ENUMERATED {n1, n2}
}
```

For example, the DL message is a service availability message listing TMGI #1, TMGI #3, TMGI #5 and TMGI #10. If UE is interested in TMGI #5, UE indicates the order of TMGI #5 in the message, i.e. UE reports '3' to the BS For example, the DL message is a service availability message listing G-RNTI #1, G-RNTI #3, G-RNTI #5 and G-RNTI #10. If UE is interested in G-RNTI #10, UE indicates the order of G-RNTI #10 in the message, i.e. UE reports '4' to the BS.

2. Upon receiving the message, BS provides CFR configuration, one or more group common PDSCH configurations including TCI states for one or more G-RNTI values, search space configuration including TCI states for one or more G-RNTI value(s) to the UE by a RRC message. Upon receiving the RRC message, UE configures one or more group common SPS configurations according to the RRC message.

A. The RRC message can be group common message transmitted on PTM MCCH (Multicast Control Channel) or UE dedicated message transmitted on UE specific DCCH (Dedicated Control Channel)

B. UE is configured at least with a G-RNTI value for each MBS CFR (common frequency resource) or each serving cell. GC-CS-RNTI can be also configured and used for activation, retransmission or release of one or more group common SPS configurations.

One or more TMGIs are configured and associated with tci-StatesToAddModList. If PDSCH transmission is mapped to a TMGI associated with tci-StatesToAddModList, the PDSCH transmission is associated with the tci-StatesToAddModList One or more G-RNTIs are configured and associated with tci-StatesToAddModList. If PDSCH transmission is mapped to a MBS service of the G-RNTI associated with tci-StatesToAddModList, the PDSCH transmission is associated with the tci-StatesToAddModList.

A value of GC-CS-RNTI or CS-RNTI is configured and associated with tci-StatesToAddModList. If a PDSCH transmission is mapped to the value of GC-CS-RNTI or CS-RNTI associated with tci-StatesToAddModList, the PDSCH transmission is associated with the tci-StatesToAddModList One or more HARQ Process IDs are associated with tci-StatesToAddModList. If PDSCH transmission is mapped to HARQ Process ID associated with tci-StatesToAddModList, the PDSCH transmission is associated with the tci-StatesToAddModList.

3. If a search space has been configured for the configured CFR, UE monitors PDCCH on the configured SS (search space) in the configured CFR to receive DCI of which CRC is scrambled with G-RNTI or GC-CS-RNTI.

A. For the configured SS, UE determines the TCI state(s) of PDCCH DM-RS to monitor PDCCH on CORESET addressed by a CORESET ID on the configured SS as follows:

Option 3A: UE determines one or more TCI states in TCI state list configured by the RRC message for the configured SS and/or G-RNTI(s)/TMGI(s) which UE is interested to receive. If only one TCI state is configured on the CORESET by TCI state list, UE in RRC_CONNECTED monitors PDCCH on CORESET of the configured SS with the TCI state configured for the CORESET ID of the CORESET by the RRC message.

Option 3B: UE determines one or more TCI states indicated by UE specific MAC CE among all TCI states configured by the RRC message. UE in RRC_CONNECTED monitors PDCCH on CORESET of the configured SS with the TCI state indicated for the CORESET ID of the CORESET in 'TCI State Indication for UE-specific MAC CE' among TCI state list associated to G-RNTI(s)/TMGI(s) which UE is interested to receive as described above or TCI state list in CORESET configuration of the CORESET ID for the CFR or this UE.

The Serving Cell ID of 'TCI State Indication for UE-specific MAC CE' shown below indicates the identity of the Serving Cell for which the MAC CE applies. The Serving Cell ID corresponds to the serving cell associated to the CFR or the serving cell of UE's active BWP associated to the CFR. The Serving Cell ID field can be replaced by CFR ID of the CFR. For indication to the TCI state of group common PDCCH with GC-CS-RNTI/CS-RNTI, the Serving Cell ID field can be replaced by G-RNTI configured by the RRC message.

FIG. 9 illustrates TCI State Indication for UE-specific MAC CE.

Option 3C: UE determines one or more TCI states indicated by group common MAC CE among all TCI states configured by the RRC message. UE in RRC_CONNECTED monitors PDCCH on CORESET of the configured SS with the TCI state indicated for the CORESET ID of the CORESET in 'TCI State Indication for Group Common MAC CE' among tci-StatesToAddModList associated to the G-RNTI/TMGI as described above or TCI state list in CORESET configuration of the CORESET ID for the CFR or this UE.

PDSCH carrying a group common MAC CE such as 'TCI State Indication for Group Common MAC CE' is scheduled by DCI of which CRC is scrambled by G-RNTI or GC-CS-RNTI or CS-RNTI.

If PDSCH carrying the group common MAC CE is scheduled by DCI of which CRC is scrambled by G-RNTI, UE considers that the group common MAC CE applies to group common DCI reception with G-RNTI or UE specific DCI reception associated to G-RNTI (e.g. PTP retransmission for G-RNTI) or SPS (re)activation DCI associated to G-RNTI or SPS retransmission DCI associated to G-RNTI. For example, If PDSCH carrying 'TCI State Indication for Group Common MAC CE' is scheduled by DCI of which CRC is scrambled by G-RNTI, UE considers the TCI state indicated by the MAC CE is applied to group common DCI reception with G-RNTI or SPS re-transmission DCI associated to G-RNTI.

Two options of MAC CE formats for 'TCI State Indication for Group Common MAC CE' are shown in FIGS. 10(a) and (b). The Serving Cell ID field in the MAC CE indicates the identity of the Serving Cell for which the MAC CE applies. The Serving Cell ID corresponds to the serving cell associated to the CFR or the serving cell of UE's active BWP associated to the CFR. ConfigIndex field indicates CFR ID of the CFR or short ID of TMGI configured by the RRC message.

If CORESET ID field is included in 'TCI State Indication for Group Common MAC CE', up to N-2 TCI State ID fields can be added to indicate one or more TCI states activated for the CORESET of the CORESET ID either for the Serving Cell ID and ConfigIndex field or for the G-RNTI field.

Alternatively, instead of CORESET ID field, CORESET ID BITMAP field indicates 8 CORESET IDs, i.e. CORESET ID=0, 1, 2, . . . and 7. Each bit of CORESET ID BITMAP field indicates whether the TCI state ID of the corresponding CORESET ID configured for the configured SS is added in this MAC CE. If CORESET ID BITMAP field is not included in this MAC CE. 8 TCI state ID fields are included in this MAC CE for 8 CORESET IDs in the increasing order of CORESET ID. If the Serving Cell ID field and the ConfigIndex field are included, each TCI state ID indicates the TCI state for the CORESET ID for the Serving Cell ID field and the ConfigIndex field. If G-RNTI field is included, each TCI state ID indicates the TCI state for the CORESET ID for the G-RNTI in the increasing order of CORESET ID. The G-RNTI field can be replaced by TMGI field. In this case, each TCI state ID indicates the TCI state for the CORESET ID for TMGI in the increasing order of CORESET ID.

FIG. 10: TCI State Indication for Group Common MAC CE

B. UE receives PDCCH on CORESET addressed by a CORESET ID on the configured SS with the determined TCI state determined for the CORESET ID as follows:

If only one TCI state is determined to monitor PDCCH with G-RNTI, UE receives PDCCH with the determined TCI state.

If more than one TCI state is determined to monitor PDCCH with G-RNTI, UE select one or more TCI states to receives PDCCH as follows:

1). UE autonomously selects only one TCI state or a few TCI states among the determined TCI states.

2). UE selects one TCI state with the lowest (or highest) TCI State ID among the determined TCI states.

3). UE selects all determined TCI states.

4). UE selects only one or more determined TCI states corresponding to the TCI state(s) that has selected for UE specific PDCCH with C-RNTI or other RNTI 5). UE selects only one or more determined TCI states of RS(s) of which measured quality is above a threshold set by BS.

6). UE selects only one determined TCI state of RS of which measured quality is best among all determined TCI states.

If multiple CORETSETs are configured for same or different CORESET IDs on the configured SS, UE may select one or multiple different TCI states. If multiple different TCI states are selected for multiple CORESETs for same or different CORESET IDs, UE maps different TCI states to different CORESETs of same or different CORESET IDs as follows:

1). Option 3-1: same value of IDs are mapped, i.e. TCI state ID #k is mapped to CORESET ID #k within a duration (k=0, 1, 2 . . . )

2). Option 3-2: kth TCI state ID in the increasing order of TCI state IDs is mapped to kth CORESET ID in the increasing order of CORESET IDs within a duration (k=1, 2 . . . )

3). Option 3-3: mapping between TCI state IDs and CORESET IDs is configured by the RRC message or UE specific MAC CE or group common MAC CE.

After mapping different TCI states to different CORESETs of same or different CORESET IDs, UE receives one or more CORESETs mapped to the selected TCI state(s) to monitor PDCCH for GC-CS-RNTI, CS-RNTI or G-RNTI.

4. If a data unit is available on a MTCH of a MRB for a MBS service, BS constructs and transmits a TB including the data unit for a SPS PDSCH occasion associated to the MTCH of the MRB for the MBS service, or associated to TMGI of the MBS service, or associated to a short ID of the MBS service, or associated to G-RNTI mapped to the MBS service, according to the service-to-resource mapping.

For group common dynamic scheduling of the TB, BS transmits DCI on PDCCH to UE. CRC of the DCI is scrambled by G-RNTI or GC-CS-RNTI or CS-RNTI. The PDCCH is group common PDCCH or UE specific PDCCH.

The DCI includes the following fields.

TABLE 7

Identifier for DCI formats: This field may indicate MBS specific DCI format or one of the existing DCI format for MBS
Carrier indicator: This field indicates either the (serving or MBS specific) cell of the CFR or the serving cell of the UE's active BWP associated to the CFR where group common PDCCH/PDSCH is transmitted.
Bandwidth part indicator: This field indicates either the BWP ID assigned to the CFR or the BWP ID of the UE's active BWP associated to the CFR where group common PDCCH/PDSCH is transmitted.
Frequency domain resource assignment
Time domain resource assignment
VRB-to-PRB mapping
PRB bundling size indicator
Rate matching indicator
ZP CSI-RS trigger
Modulation and coding scheme
New data indicator (NDI)
Redundancy version
HARQ process number
Downlink assignment index
TPC command for scheduled PUCCH
PUCCH resource indicator
PDSCH-to-HARQ_feedback timing indicator
Antenna port(s)
Transmission configuration indication
SRS request
DMRS sequence initialization
Priority indicator For group common dynamic scheduling, BS provides one or more of the following service-to-resource mappings for a MBS service identified by a TMGI or a G-RNTI or a GC-CS-RNTI to UE by group common or UE specific RRC message or by group common or UE specific MAC CE. Data of the MBS service is carried on a MBS radio bearer (MRB) of a multicast traffic logical channel, i.e. MTCH associated to the MBS service. The RRC message can be group common message transmitted on PTM MCCH (Multicast Control Channel) or UE dedicated message transmitted on UE specific DCCH (Dedicated Control Channel) The DCI scheduling PDSCH carrying the MBS service data may also indicate one or more of a short ID, a MTCH ID, a MRB ID, a G-RNTI value and a TMGI value for the MBS service.

5. For reception of PDCCH scheduling Nth HARQ transmission of the TB, UE selects a TCI state for group common PDCCH as follows:

Option 5-1: UE selects the TCI state configured by UE specific RRC reconfiguration (typically for FR1)

1). BS does not provide mapping between all CORESETs and all TCI states for G-RNTI 2). Upon receiving UE specific RRC reconfiguration, UE monitors the reconfigured MO or CORESET at least for multicast service according to the TCI state configured by UE specific RRC reconfiguration.

Option 5-2: UE selectively monitors one or more of MOs (Monitoring Occasions) and CORESET(s) associated to the selected TCI state (for FR2)

1). BS provides UE with mapping between all CORESETs and all TCI states for G-RNTI by RRC 2). Multiple CORESET/SSs or different MOs are configured for different TCI states 3). UE autonomously selects MO or CORESET based on the selected TCI state at least for broadcast service 4). Note that idle/inactive UEs already support Option 2 for broadcast.

Option 5-3: BS informs UE about mapping between G-RNTI and TCI state. Then, UE selects G-RNTI among multiple G-RNTIs mapped to same TB based on the selected TCI state 1). Different G-RNTIs are mapped to different TCI states 6. Upon receiving the DCI of which CRC is scrambled by G-RNTI which UE is interested to receive, UE determines MBS service(s) associated to one or more of a short ID, a MTCH ID, a MRB ID, a G-RNTI value and a TMGI value for each of the PDSCH occasions, based on mapping between MBS services and HPNs (HARQ Process Numbers) indicated in the DCI, and/or mapping between MBS services and, if available, short ID(s) indicated in the DCI.

Then, if UE is interested in the determined MBS service(s), UE receives PDSCH transmission scheduled by the DCI. If UE is not interested in the determined MBS service(s), UE does not receive PDSCH transmission scheduled by the DCI. Depending on the decoding status of PDSCH transmission, UE sends HARQ feedback to BS.

The base station may instruct HARQ feedback enabling/disabling to the UE. For example, Disabling of HARQ feedback may be indicated as follows.

Method 1-1: DCI Based Disabling

Opt 1: A specific value of PRI indicates disabling HARQ feedback.

Opt 2: A specific value of DAI indicates disabling HARQ feedback

Opt 3: A specific value of PDSCH repetition indicates disabling HARQ feedback

Opt 4: SUL indicator, if SUL is not configured by RRC

Method 1-2: RRC Based Disabling

Enabling and/or disabling is configured per HPN. For example, for DCI indicating HPN, HPN=1 is configured for enabled HPN=2 is configured for disabled HPN=3 is configured for both. enabled or disabled is finally by DCI HPN=4 is configured for 'initially enabled and then disabled for retransmission'

HPN=5 is configured for 'initially disabled and then enabled for retransmission'

Enabling and/or disabling is configured per G-RNTI. For example, for scrambling CRC of DCI, G-RNTI=87 is configured for both. Enabled or disabled is finally by DCI A group of G-RNTIs mapped to same TMGI(s) is configured for both. Each of the G-RNTIs is configured for either enabled or disabled. For example:

G-RNTI=87: enabled

G-RNTI=88: disabled

7. BS may set tci-PresentInDCI to 'enabled' or configure tci-PresentDCI-1-2 for a CORESET for group common PDCCH.

tci-PresentInDCI: This field indicates if TCI field is present or absent in DCI format 1_1. When the field is absent the UE considers the TCI to be absent/disabled. In case of cross carrier scheduling, the network sets this field to enabled for the Control-ResourceSet used for cross carrier scheduling in the scheduling cell (see TS 38.214 [19], clause 5.1.5).

tci-PresentDCI-1-2: Configures the number of bits for "Transmission configuration indicator" in DCI format 1_2. When the field is absent the UE applies the value of 0 bit for the "Transmission configuration indicator" in DCI format 1_2 (see TS 38.212, clause 7.3.1 and TS 38.214, clause 5.1.5)

8. If tci-PresentInDCI is set to 'enabled' or tci-PresentDCI-1-2 is configured for the CORESET scheduling the group common PDSCH, and the time offset between the reception of the DL DCI and the corresponding PDSCH is equal to or greater than timeDurationForQCL if applicable, after a UE receives an initial higher layer configuration of TCI states and before reception of the activation command i.e. TCI State Indication for Group Common MAC CE or for UE specific MAC CE which activates a TCI state, Option 7-1: the UE assumes that the TCI state or the QCL assumption for the group common PDSCH is identical to the TCI state or QCL assumption whichever is applied for the CORESET used for the group common PDCCH transmission within the CFR.

Option 7-2: If default TCI state is configured by RRC, the UE assumes that the TCI state or the QCL assumption for the group common PDSCH is identical to the default TCI state.

Option 7-3: the UE may assume that the DM-RS ports of group common PDSCH of the CFR are quasi co-located with the SS/PBCH block determined in the previous RACH (e.g. during initial access) with respect to qcl-Type set to 'typeA', and when applicable, also with respect to qcl-Type set to 'typeD'.

If the group common PDSCH is scheduled by a DCI format not having the TCI field present, and the time offset between the reception of the DL DCI and the corresponding PDSCH of the CFR is equal to or greater than a threshold timeDurationForQCL if applicable for determining PDSCH antenna port quasi co-location, the UE assumes that the TCI state or the QCL assumption for the group common PDSCH is identical to the TCI state or QCL assumption whichever is applied for the CORESET used for the group common PDCCH transmission within the CFR.

The threshold timeDurationForQCL is based on UE's own UE capability reported to BS, The threshold timeDurationForQCL is based on the lowest UE capability that can be reported to BS or configured for the CFR by BS The threshold timeDurationForQCL is based on the threshold configured by BS.

Independent of the configuration of tci-PresentInDCI and tci-PresentDCI-1-2, regardless of whether PDCCH/PDSCH is group common or UE specific, if the offset between the reception of the DL DCI and the corresponding PDSCH is less than the threshold timeDurationForQCL, the UE assumes that the TCI state or the QCL assumption for PDSCH is identical to the TCI state or QCL assumption whichever is applied for the CORESET used for PDCCH transmission for a CFR, a BWP or a cell. In this case, the threshold timeDurationForQCL is determined as follows:

The threshold timeDurationForQCL is based on UE's own UE capability reported to BS, The threshold timeDurationForQCL is based on the lowest UE capability that can be reported to BS or configured for the CFR, the BWP or the cell by BS The threshold timeDurationForQCL is based on the threshold configured by BS.

9. If the pdsch-AggregationFactor is configured, the TB scheduled by group common DCI can be repeated for Nth HARQ transmission of a TB within each symbol allocation among each of the pdsch-AggregationFactor consecutive slots, if configured.

In this case, same or different TCI states can be configured for different slots of the repetition. Group common/UE specific MAC CE can be used to activate/deactivate TCI states or reconfigure mapping between TCI states and repetitions.

If group common DCI can indicate the number of repetitions for PDSCH for Nth HARQ transmission of a TB, same or different TCI states can be configured for different slots of the repetition. The DCI can be used to activate/deactivate TCI states or reconfigure mapping between TCI states and repetitions.

For dynamic scheduling, the DCI schedules initial transmission or retransmission of group common PDSCH transmission(s).

For semi-persistent scheduling, the DCI (de-)activates a group common SPS configuration or schedules retransmission of group common PDSCH transmission(s).

BS informs UE about mapping between a PDSCH transmission occasion and a TCI state by RRC message or Group common MAC CE or UE specific MAC CE.

1). Option 1: Different HARQ Process IDs are mapped to different TCI states (a). For example, DCI indicating HPN #1 schedules PDSCH for TCI state ID #1 while DCI indicating HPN #2 schedules PDSCH for TCI state ID #2.

2). Option 2: Different repetitions of PDSCH transmission are mapped to different TCI states for Nth HARQ transmission (a) For example, the first PDSCH repetition and the second PDSCH repetition of a TB scheduled by one DCI indicating 2 repetitions are transmitted with different TCI states.

3). Option 3: Different PDSCH occasions are mapped to different TCI states (a). For example, TCI state ID #1 is used for group common PDSCH transmissions in SFN mod M=1 while TCI state ID #2 is used for group common PDSCH transmissions in SFN mod M=2

(b) For example, different PDSCH transmissions in different slots are mapped to different TCI states. Different PDSCH transmissions in a same slot are mapped to same TCI state.

UE selects TCI state for group common PDSCH scheduled by group common DCI according to the above mapping between PDSCH transmission occasions and TCI states.

10. If decoding the TB on the PDSCH transmission occasion is unsuccessful, UE sends NACK to BS on a PUCCH resource in the configured UL CFR according to PUCCH configuration received by the RRC message, and PUCCH resource indicator and PDSCH-to-HARQ feedback timing indicator received by the retransmission DCI. The PUCCH is transmitted with the TCI state that is indicated by the DCI, or equal to the TCI state of the CORESET where the DCI was received, or equal to the TCI state of the PDSCH transmission.

11. Upon receiving the NACK with a TCI state, BS may retransmit PDCCH and PDSCH with the TCI state in the configured DL CFR for retransmission of the TB. UE monitors group common and/or UE specific PDCCH with the TCI state on the configured search space in the DL CFR to receive a retransmission of the TB.

BS can retransmit the TB to only one of the UEs in the group by UE specific PDCCH while other UEs do not receive the retransmission of the TB e.g. because they have successfully received the TB.

If the base station indicates a plurality of CFRs and a plurality of CFRs are mapped (for all or specific TMG/G-RNTI (s)), for DCI indicating PTP transmission of CFR #1 and DCI indicating PTM transmission of CFR #2, if two DCIs indicate the same HPN value and NDI, it is assumed that PTM/PTP PDSCHs are configured to transmit the same TB.

When the base station PTP retransmission is performed on the active BWP of a UE, and the active BWP of the UE is mapped to the CFR (for all or specific TMG/G-RNTI(s)), for DCI indicating PTP transmission of the UE's active BWP and DCI indicating PTM transmission of CFR, if two DCIs indicate the same HPN value and NDI, it is assumed that PTM/PTP PDSCHs are configured to transmit the same TB.

PTP retransmission for PTM transmission may be allowed only in unicast UE's active BWP mapped with CFR of PTM transmission or CFR of PTM transmission. Therefore, if the PTP retransmission does not satisfy this condition, the UE does not consider the PTP retransmission as a retransmission of the PTM transmission.

12. If UE receives the PDCCH for the retransmission of the TB, UE receives PDSCH scheduled by the DCI of the PDCCH.

If UE successfully decodes the TB on the PDSCH, UE considers that the decoded TB is associated to MTCH, MRB, TMGI, G-RNTI and/or short ID of the MBS service, based on mapping between MBS services and HPNs (HARQ Process Numbers) indicated by the DCI, and/or mapping between MBS services and, if available, short ID(s) indicated by the DCI.

13. If decoding the TB on the PDSCH transmission occasion is successful, UE sends HARQ ACK to BS on a PUCCH resource in the configured UL CFR according to PUCCH configuration received by the RRC message, and PUCCH resource indicator and PDSCH-to-HARQ feedback timing indicator received by the retransmission DCI.

14. If HARQ-ACK has been enabled for group common PDSCH, UE determines that HARQ-ACK for group common PDSCH is autonomously disabled when one of the following events occurs.

Upon detection of Beam failure

Upon detection of LBT failure

Upon detection of Handover interruption e.g. between HO command reception and RACH completion Upon detection of RLF e.g. between triggering re-establishment and RACH completion Upon triggering contention based RACH Upon triggering contention-free RACH Upon expiry of UL timing alignment timer (e.g. when UL timing becomes unsynchronized) After HARQ-ACK feedback which was enabled by BS has been autonomously disabled, UE enables HARQ feedback upon completion of RACH.

In case of Contention based RACH, UE may send pending MBS HARQ-ACK via MSG3 or HARQ feedback to MSG4, BS can request pending MBS HARQ-ACK via MSG2 or MSG4 (e.g. DCI or MAC CE)

In case of Contention-free RACH, UE sends pending MBS HARQ-ACK right after MSG2, BS can request pending MBS HARQ-ACK via MSG2 e.g. DCI or MAC CE 15. BS may activate and/or deactivate one or more TCI states for G-RNTI or the CFR or the UE by sending TCI State Indication for Group Common MAC CE or for UE specific MAC CE. Upon receiving the MAC CE, UE activates and/or deactivate the TCI state(s) indicated by the MAC CE for reception of group common PDCCH and/or group common PDSCH for the G-RNTI or the CFR indicated by the MAC CE.

16. If BS changes mapping between MBS services and HPNs (HARQ Process Numbers), and/or mapping between MBS services and, if available, short ID(s), BS can inform UE about changed mapping by sending a RRC message or a group common MAC CE (for change of group common mapping) or a UE specific MAC CE (for change of UE specific mapping).

According to an embodiment of the present invention, when a connection failure occurs, the UE disables HARQ-ACK feedback for MBS reception, and performs RACH to prevent unnecessary HARQ-ACK transmission.

FIG. 11 is a diagram for explaining operations of a UE according to an embodiment of the present disclosure. FIG. 11 is a particular implementation of the above-described examples, and thus the scope of the present disclosure is not limited to FIG. 11. The details described above may be referred to in FIG. 11.

Referring to FIG. 11, the UE may perform (B05) a first random access procedure including a first random access preamble transmission.

The UE may receive (B10) a UE-group common physical downlink control channel (PDCCH) after successful completion of the first random access procedure.

The UE may receive (B15) a UE-group common physical downlink shared channel (PDSCH) based on the UE-group common PDCCH.

The UE may perform (B20) a second random access procedure including a second random access preamble transmission after the successful completion of the first random access procedure.

Based on that i) a hybrid automatic repeat request (HARQ) process is enabled for the UE-group common PDSCH, ii) the second random access procedure has been triggered before transmitting a HARQ feedback report for the UE-group common PDSCH, and iii) the second random access procedure is not completed: the may determine not to transmit the HARQ feedback report for the UE-group common PDSCH at least during the second random access procedure is on-going.

Preferably, the UE does not transmit the HARQ feedback report for the UE-group common PDSCH even though the HARQ process has been enabled for the UE-group common PDSCH.

Preferably, the UE determines not to transmit the HARQ feedback report for the UE-group common PDSCH based on that the second random access procedure is related to a contention-based random access procedure.

Preferably, the UE determines not to transmit the HARQ feedback report for the UE-group common PDSCH based on that the second random access procedure is related to a scheduling request (SR).

Preferably, the UE drops the HARQ feedback report for the UE-group common PDSCH based on that the HARQ feedback report for the UE-group common PDSCH overlaps with a uplink signal transmission of the second random access procedure in a time domain.

Preferably, the uplink signal transmission of the second random access procedure is performed in response to a message-B (MsgB) of a 2-step random access procedure or a message 4 (Msg4) of a 4-step random access procedure.

Preferably, the uplink signal transmission of the second random access procedure is related to a physical uplink control channel (PUCCH) or a physical uplink shared channel (PUSCH).

Preferably, the UE may receive, from a base station, a request for the HARQ feedback report after completion of the second random access procedure; and transmit the HARQ feedback report to the base station based on the request for the HARQ feedback report.

FIG. 12 is a diagram for explaining operations of a BS according to an embodiment of the present disclosure. FIG. 12 is a particular implementation of the above-described examples, and thus the scope of the present disclosure is not limited to FIG. 12. The details described above may be referred to in FIG. 12.

Referring to FIG. 12, the BS may perform (C05) a first random access procedure including a first random access preamble reception from a user equipment (UE).

The BS may transmit (C10) a UE-group common physical downlink control channel (PDCCH) after successful completion of the first random access procedure.

The BS may transmit (C15) a UE-group common physical downlink shared channel (PDSCH) based on the UE-group common PDCCH.

The BS may perform (C20) a second random access procedure including a second random access preamble reception from the UE after the successful completion of the first random access procedure.

Based on that i) a hybrid automatic repeat request (HARQ) process is enabled for the UE-group common PDSCH, ii) the second random access procedure has been triggered before receiving a HARQ feedback report for the UE-group common PDSCH, and iii) the second random access procedure is not completed, the BS does not expect to receive the HARQ feedback report for the UE-group common PDSCH from the UE at least during the second random access procedure is on-going.

The various details, functions, procedures, proposals, methods, and/or operational flowcharts described in this document may be applied to a variety of fields that require wireless communication/connections (e.g., 5G) between devices.

Hereinafter, a description will be given in detail with reference to the drawings. In the following drawings/descriptions, the same reference numerals may denote the same or corresponding hardware blocks, software blocks, or functional blocks unless specified otherwise.

FIG. 13 illustrates a communication system 1 applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 15 illustrates another example of a wireless device applied to the present disclosure. The wireless device may be implemented in various forms according to a use-case/service (refer to FIG. 13).

Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

FIG. 16 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 16, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles.

In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

FIG. 17 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 17, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 8 describes a DRX operation of a UE (in the RRC_CONNECTED state). Referring to Table 8, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 8

|  | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |

TABLE 8-continued

| Type of signals | UE procedure |
|---|---|
| 3$^{rd}$ Step — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method of transmitting a signal by a user equipment (UE) in a wireless communication system, the method comprising:

performing a first random access procedure including a first random access preamble transmission;

receiving a UE-group common physical downlink control channel (PDCCH) after successful completion of the first random access procedure;

receiving a UE-group common physical downlink shared channel (PDSCH) based on the UE-group common PDCCH; and performing a second random access procedure including a second random access preamble transmission after the successful completion of the first random access procedure, wherein, based on that i) a hybrid automatic repeat request (HARQ) process is enabled for the UE-group common PDSCH, ii) the second random access procedure has been triggered before transmitting a HARQ feedback report for the UE-group common PDSCH, and iii) the second random access procedure is not completed: the UE determines not to transmit the HARQ feedback report for the UE-group common PDSCH at least during the second random access procedure is on-going.

2. The method according to claim 1, wherein the UE does not transmit the HARQ feedback report for the UE-group common PDSCH even though the HARQ process has been enabled for the UE-group common PDSCH.

3. The method according to claim 1, wherein the UE determines not to transmit the HARQ feedback report for the UE-group common PDSCH based on that the second random access procedure is related to a contention-based random access procedure.

4. The method according to claim 1, wherein the UE determines not to transmit the HARQ feedback report for the UE-group common PDSCH based on that the second random access procedure is related to a scheduling request (SR).

5. The method according to claim 1, wherein the UE drops the HARQ feedback report for the UE-group common PDSCH based on that the HARQ feedback report for the UE-group common PDSCH overlaps with a uplink signal transmission of the second random access procedure in a time domain.

6. The method according to claim 5, wherein the uplink signal transmission of the second random access procedure is performed in response to a message-B (MsgB) of a 2-step random access procedure or a message 4 (Msg4) of a 4-step random access procedure.

7. The method according to claim 5, wherein the uplink signal transmission of the second random access procedure is related to a physical uplink control channel (PUCCH) or a physical uplink shared channel (PUSCH).

8. The method according to claim 1, further comprising:

receiving, from a base station, a request for the HARQ feedback report after completion of the second random access procedure; and transmitting the HARQ feedback report to the base station based on the request for the HARQ feedback report.

9. A computer-readable medium storing a program for executing the method of claim 1.

10. A device for wireless communication, the device comprising:

a memory configured to store instructions; and a processor configured to perform operations by executing the instructions, wherein the operations performed by the processor comprise:

performing a first random access procedure including a first random access preamble transmission;

receiving a group common physical downlink control channel (PDCCH) after successful completion of the first random access procedure;

receiving a group common physical downlink shared channel (PDSCH) based on the group common PDCCH; and performing a second random access procedure including a second random access preamble transmission after the successful completion of the first random access procedure, wherein, based on that i) a hybrid automatic repeat request (HARQ) process is enabled for the group common PDSCH, ii) the second random access procedure has been triggered before transmitting a HARQ feedback report for the group common PDSCH, and iii) the second random access procedure is not completed: the processor determines not to transmit the HARQ feedback report for the group common PDSCH at least during the second random access procedure is on-going.

11. The device of claim 10, wherein the device is an application-specific integrated circuit (ASIC) or a digital signal processor.

12. The device of claim 10, wherein the device is a user equipment (UE) operating in a 3rd generation partnership project (3GPP) based wireless communication system.

13. A base station (BS) for wireless communication, the BS comprising:

a transceiver; and a processor configured to control the transceiver to:

perform a first random access procedure including a first random access preamble reception from a user equipment (UE);

transmit a UE-group common physical downlink control channel (PDCCH) after successful completion of the first random access procedure;

transmit a UE-group common physical downlink shared channel (PDSCH) based on the UE-group common PDCCH; and perform a second random access procedure including a second random access preamble reception from the UE after the successful completion of the first random access procedure, wherein, based on that i) a hybrid automatic repeat request (HARQ) process is enabled for the UE-group common PDSCH, ii) the second random access procedure has been triggered before receiving a HARQ feedback report for the UE-group common PDSCH, and iii) the second random access procedure is not completed: the processor does not expect to receive the HARQ feedback report for the UE-group common PDSCH from the UE at least during the second random access procedure is on-going.

* * * * *